July 5, 1927.
J. S. ROWLEY ET AL
1,634,630
DIRIGIBLE HEADLIGHT MECHANISM
Filed Nov. 25, 1925   2 Sheets-Sheet 1
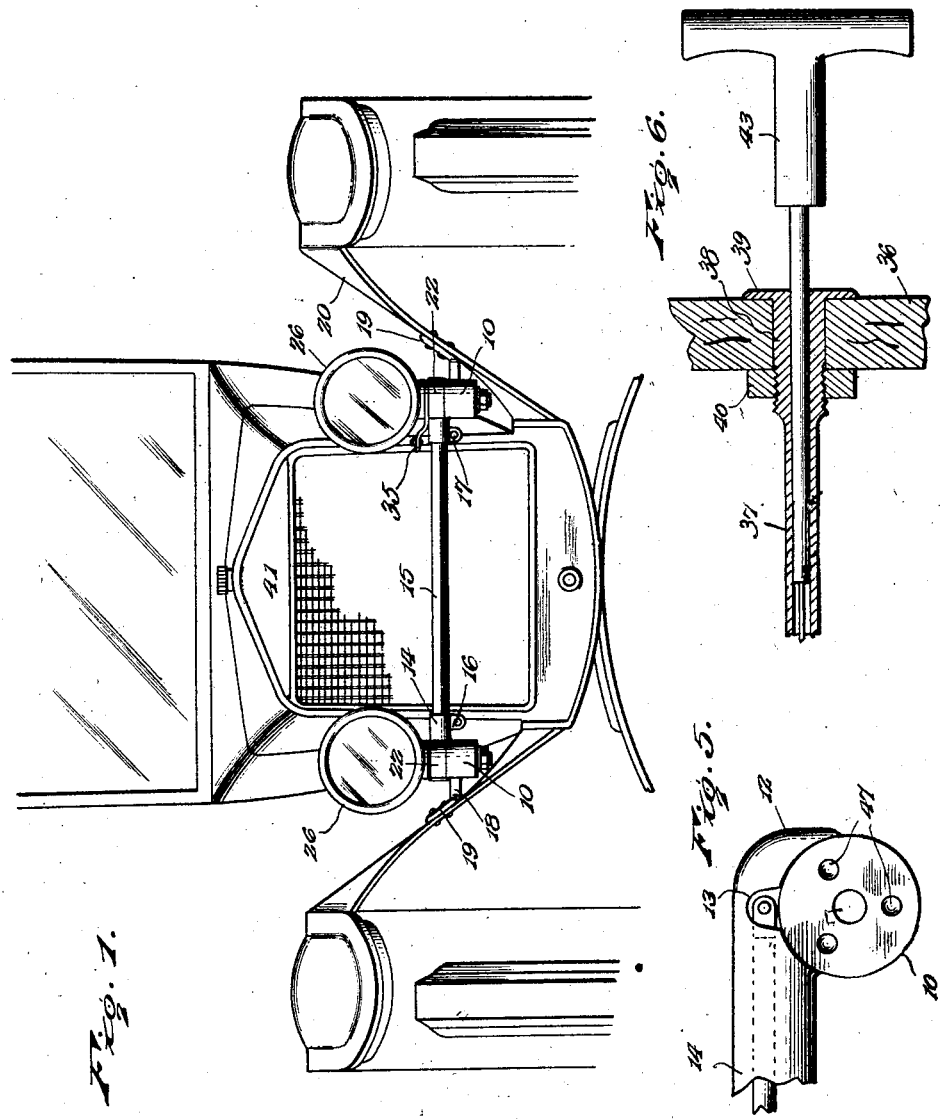
Inventors
J. S. Rowley.
J. W. Riggins.
H. E. McCully.
By Lacy & Lacy, Attorneys

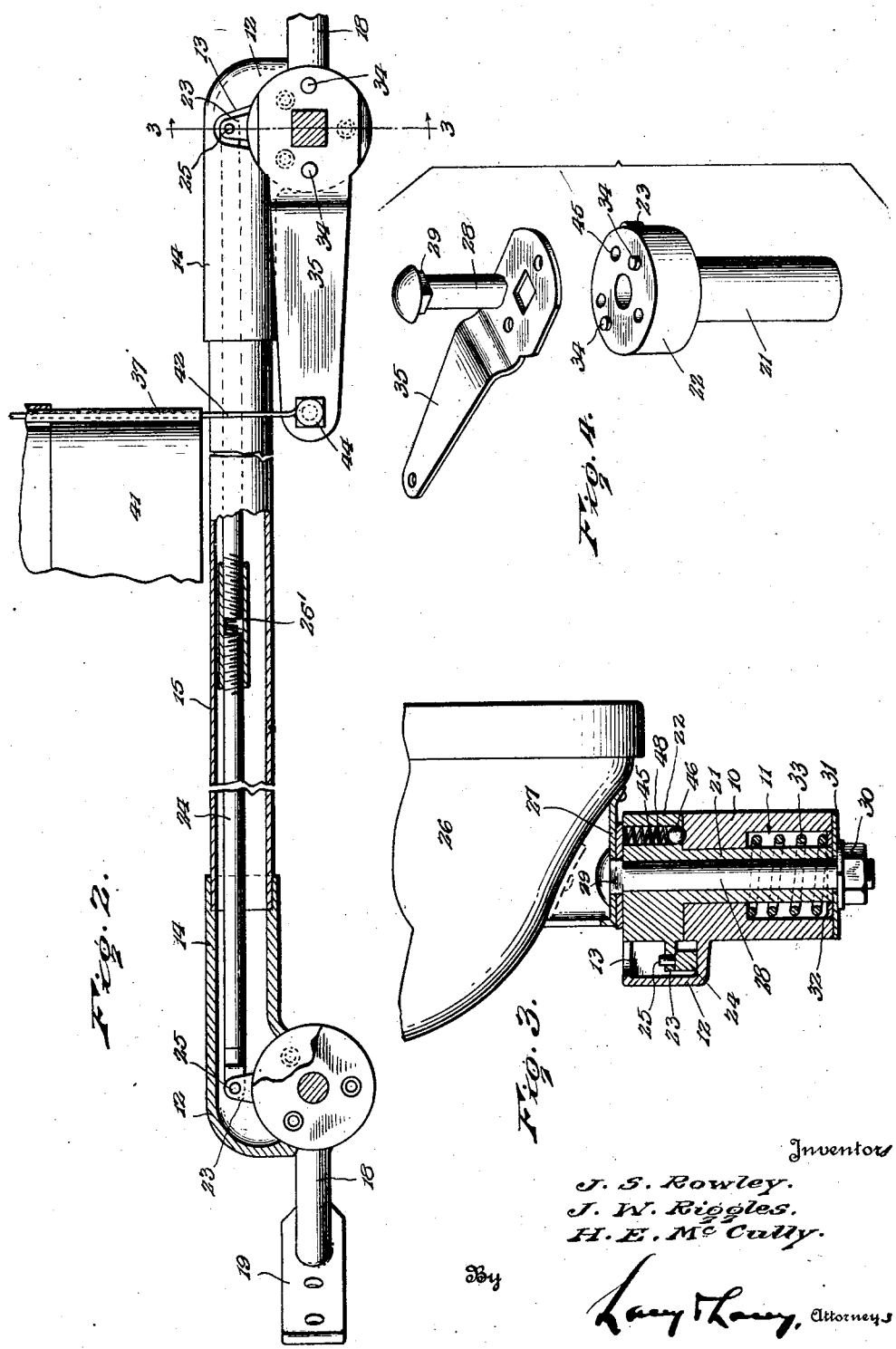

Patented July 5, 1927.

1,634,630

UNITED STATES PATENT OFFICE.

JOHN S. ROWLEY, JOHN W. RIGGLES, AND HILAND E. McCULLY, OF LANSING, MICHIGAN.

DIRIGIBLE-HEADLIGHT MECHANISM.

Application filed November 25, 1925. Serial No. 71,433.

This invention relates to an improved dirigible headlight mechanism of the general character disclosed in our prior application for a similar invention filed October 30, 1924, Serial No. 746,847, and seeks, among other objects, to provide a mechanism of simplified construction and, at the same time, of increased efficiency and convenience.

The invention seeks, as a further object, to provide an improved means for normally locking the headlights in position directed straight ahead.

Still another object of the invention is to provide an improved mounting for the headlights.

And the invention seeks, as a still further object, to provide an improved means for turning the headlights.

Other objects of the invention not specifically mentioned in the foregoing, will appear during the course of the following description.

In the accompanying drawings:

Figure 1 is a front elevation showing the present mechanism in connection with a conventional motor vehicle.

Figure 2 is a horizontal sectional view particularly showing the housing for the connecting rod which extends between the rotatable spindles of the mechanism, a portion of the housing being broken away and shown in section.

Figure 3 is a vertical sectional view on the line 3—3 of Figure 2, looking in the direction indicated by the arrows.

Figure 4 is a detail perspective view showing one of the rotatable spindles and the operating arm therefor.

Figure 5 is a plan view particularly showing the sockets in the upper ends of the bearings for the spindles.

Figure 6 is a fragmentary sectional view particularly showing the flexible operating shaft and control handle.

In carrying the invention into effect, we employ a pair of tubular bearings 10 counterbored at their lower ends to form recesses 11, and extending from the rear sides of the bearings at their upper ends are housings 12, the upper side walls of which are provided with openings 13. The housings 12 terminate in alined nipples 14 which extend toward each other between the bearings and are split at the free ends thereof to accommodate a housing tube 15 which extends between said nipples. Depending from the nipples at the lower sides thereof, as more particularly shown in Figure 1, are pairs of mating ears 16 which accommodate suitable fastening devices 17 adjustable for clamping the ends of the nipples in engagement with the ends of the tube. Extending from the bearings 10, at the outer sides thereof, are brackets 18 which terminate in flanges 19. As shown in Figure 1, these flanges are disposed to rest flat against the aprons 20 of the front fenders of the motor vehicle, and extending through said flanges and through said aprons are suitable fastening devices rigidly connecting the brackets with said fenders for supporting the bearings 10 in vertical position at the front of the vehicle radiator.

Journaled through the bearings 10 are tubular spindles 21 provided at their upper ends with circular heads 22 resting flat against the upper ends of the bearings, and projecting from the rear sides of said heads are arms 23 which are freely accommodated in the housings 12 of said bearings. As brought out in Figure 2, the openings 13 in the housings are adapted to freely receive the arms 23 therethrough so that the spindles may be readily assembled upon the bearings, and extending between the arms of said spindles is a connecting rod 24 which, as seen in Figure 3, is provided at its ends with upstanding pins 23 engaged through said arms. Thus the spindles are coupled to rotate in unison while the connecting rod is enclosed so that mud cannot collect thereon and, preferably, the connecting rod is formed of sections adjustably connected by a sleeve 25' so that the length of the rod may be readily varied.

The headlights are indicated at 26. These headlights may be of any approved design but, for the purpose of the present invention, are equipped at their lower sides with base members 27. These base members are preferably formed of suitable sheet metal and are provided with flat surfaces to confront the upper ends of the head 22 for the spindles. Extending through the base members and through said spindles are bolts 28 which are provided at their upper ends with squared portions 29, and screwed on the lower ends of the bolts are nuts 30. As shown in Figure 3, the squared portions 29 of said bolts fit through correspondingly shaped openings in the base members 27 of the headlights so that the headlights will thus turn with the bolts, and interposed between the nuts 30 of said bolts and the lower ends of the bearings 10, are end plates 31 closing the recesses 11 of said bearings. Fitting the lower ends of the spindles 21 within said recesses are washers 32, and freely accommodated in said recesses are springs 33 bearing at their lower ends against said washers for yieldably holding the spindles against upward displacement.

As will be perceived, the nuts 30 may be adjusted for tightly binding the spindles and the headlights 26 in assembled relation while the springs 33 will function to take up any looseness which may develop between the parts, so that, at all times, the headlights and the spindles will be tightly connected to turn in unison.

Rising from the upper end of the head 22 of the spindle 21 at the left of the vehicle, as seen in Figures 1 and 2 of the drawings, are spaced studs 34, and interposed at one end between the base member 27 of the headlight of said spindle and the spindle head, as seen in Figure 3, is an arm 35 apertured to accommodate said studs. As shown in Figure 4, the arm is also provided with a squared opening to receive the squared portion 29 of the bolt which connects the headlight with the spindle so that the arm is not only rigidly connected with the spindle but is also rigidly connected with said bolt and, of course, the adjacent end of the arm will be tightly clamped between the base member 27 of the headlight and the head of the spindle. As brought out in Figure 2, the arm extends laterally inward in a direction between the headlights and is offset upwardly to clear the housing 12 and nipple 14 of the adjacent bearing 10. Extending through the instrument board 36 of the vehicle, as shown in Figure 6, is a flexible sheath 37 which is provided at its adjacent end with a head 38 having a flange 39 to abut the outer face of the instrument board, and screwed on said head is a nut 40 abutting the inner face of the instrument board for rigidly connecting the sheath therewith. The sheath 37 extends forwardly beneath the motor vehicle hood and, as shown in Figure 2, emerges at the forward end of the hood at the adjacent side of the vehicle radiator 41, and slidable through said sheath is a flexible shaft 42. Fixed to the rear end of said shaft is a handle 43, and connecting the forward end of the shaft with the arm 35 is a bolt or other suitable fastening device 44. Thus, as will be seen, by drawing the handle 43 rearwardly, the arm 35 may be swung for turning the headlights laterally in one direction while, by pushing forwardly on the handle, the headlights may be turned laterally in the opposite direction.

Formed in each of the heads 22 of the spindles 21 is a plurality of spaced vertically disposed openings 45, and freely received in said openings are ball detents 46. Formed in the upper face of each of the bearings 10, as shown in Figure 5, is a plurality of sockets 47 to accommodate said detents, and pressing the detents downwardly to normally seat in said sockets are springs 48 which are freely received in the openings 45 of the heads of the spindles. As shown in Figure 3, the inner end of the arm 35 provides a retaining means for the springs of one of the spindles while the springs of the other spindle are, as will be at once appreciated, retained by the base member 27 of the headlight carried by the latter spindle. Thus, as will be perceived, the detents 46 will normally serve to yieldably lock the headlights in position directed straight ahead. However, the headlights may, nevertheless, be swung laterally in either one direction or the other, as previously explained, when, upon the return of the headlights to their normal position, the detents 46 will again seat in the sockets 47 of the bearings 10 for rigidly locking the headlights against vibration.

Having thus described the invention, what we claim is:

1. In a dirigible headlight mechanism, a bearing formed with a bore, a spindle journaled in the bore of said bearing and provided with a head overlying the upper end of said bearing, said spindle having an axially disposed bore, a headlight, a bracket for the headlight formed with a non-circular opening, a turning handle having one end portion disposed between the lamp bracket and head of said spindle and formed with an opening registering with and conforming to the contour of the opening in the lamp bracket, means for interlocking the turning handle with the head of said spindle to prevent independent turning thereof, and a bolt passed through the bore of said spindle and having a head at its upper end overlying said lamp bracket and adjoining its head having its shank formed with a non-circular portion snugly seated in the non-circular openings of the lamp bracket and turning handle.

2. In a dirigible headlight mechanism, a bearing formed with a bore, a spindle journaled in the bore of said bearing and provided with a head overlying the upper end of said bearing, said spindle having an axially disposed bore, pins projecting upwardly from the spindle head, a turning handle resting upon the spindle head and having openings securing said pins, a headlight, a bracket for said headlight resting upon said handle above said spindle, and a bolt passed through the headlight bracket, turning handle and spindle bore to hold the headlight and handle in engagement with the spindle.

In testimony whereof we affix our signatures.

JOHN S. ROWLEY. [L. S.]
JOHN W. RIGGLES. [L. S.]
HILAND E. McCULLY. [L. S.]